US012040916B2

(12) United States Patent
Drennan

(10) Patent No.: US 12,040,916 B2
(45) Date of Patent: Jul. 16, 2024

(54) GATEWAY OUTDOOR UNIT ACCESS POINT

(71) Applicant: DISH Network L.L.C., Englewood, CO (US)

(72) Inventor: Ross Alan Drennan, Monument, CO (US)

(73) Assignee: DISH Network L.L.C., Englewood, CO (US)

( * ) Notice: Subject to any disclaimer, the term of this patent is extended or adjusted under 35 U.S.C. 154(b) by 288 days.

(21) Appl. No.: 17/645,854

(22) Filed: Dec. 23, 2021

(65) Prior Publication Data

US 2023/0208681 A1 Jun. 29, 2023

(51) Int. Cl.
| | |
|---|---|
| *H04W 4/00* | (2018.01) |
| *H04B 7/185* | (2006.01) |
| *H04L 12/66* | (2006.01) |
| *H04W 84/12* | (2009.01) |
| *H04W 88/10* | (2009.01) |
| *H04W 88/16* | (2009.01) |

(52) U.S. Cl.
CPC ......... *H04L 12/66* (2013.01); *H04B 7/18513* (2013.01); *H04W 84/12* (2013.01); *H04W 88/10* (2013.01); *H04W 88/16* (2013.01)

(58) Field of Classification Search
CPC ........ H04L 12/66; H04W 88/12; H04B 7/185; H04B 7/18513
See application file for complete search history.

(56) References Cited

U.S. PATENT DOCUMENTS

| | | | | |
|---|---|---|---|---|
| 11,005,560 | B1 * | 5/2021 | Venugopal | H04B 7/155 |
| 2003/0085841 | A1 * | 5/2003 | Spilker, Jr. | G01S 5/0036 |
| | | | | 342/464 |
| 2004/0207556 | A1 * | 10/2004 | Spilker, Jr. | H04N 21/615 |
| | | | | 342/464 |
| 2008/0024662 | A1 * | 1/2008 | Chu | H04N 7/20 |
| | | | | 348/553 |
| 2013/0003719 | A1 * | 1/2013 | Kamdar | H04W 4/90 |
| | | | | 370/352 |
| 2020/0213211 | A1 * | 7/2020 | Jain | H04L 43/08 |
| 2021/0119842 | A1 * | 4/2021 | Ambeskar | H04L 27/266 |
| 2021/0203582 | A1 * | 7/2021 | Torres | H04L 12/66 |
| 2021/0204011 | A1 * | 7/2021 | Jain | H04L 65/80 |

OTHER PUBLICATIONS

Monk et al., The Multimedia Over Coax Alliance, Jul. 12, 2013, IEEE, pp. 1-17. (Year: 2013).*
"Moca Home 2.5", downloaded from the Internet on Sep. 7, 2021, at http://www.mocalliance.org/MoCA2.5/index.htm.

* cited by examiner

*Primary Examiner* — Elisabeth Benoit Magloire
(74) *Attorney, Agent, or Firm* — Wash Park IP Ltd.; John T. Kennedy

(57) ABSTRACT

A system includes an integrator node (IN), external to a building. A gateway, within the building, is coupled to the integrator node by a first link. A gateway outdoor unit access point (GOUAP) is coupled to the IN by a second link. The GOUAP is coupled to a user device by a third link. The gateway is coupled to a Cloud. The GOUAP provides access to the Cloud, by the user device, when the user device is outside the building. The first link and/or the second link utilizes MOCA. The third link utilizes Wi-Fi. An Internal Network Extender (INE) is coupled to the gateway by a fifth link and located within the building. While the user device is external to the building, the user device utilizes the third link, the second link, and the first link to communicatively couple with the gateway.

20 Claims, 1 Drawing Sheet

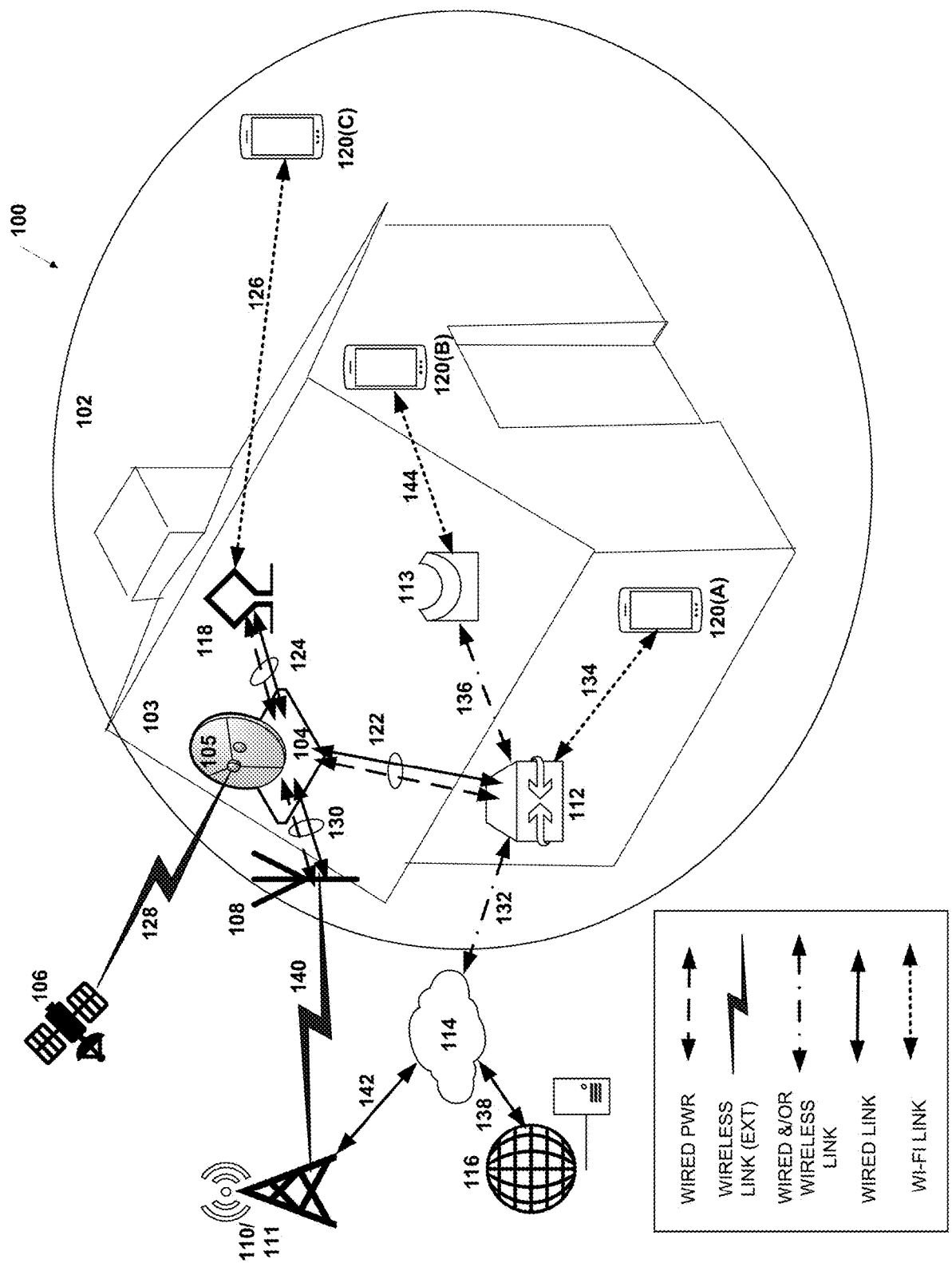

GATEWAY OUTDOOR UNIT ACCESS POINT

TECHNICAL FIELD

The technology described herein generally relates to devices and systems for providing Internet access to devices situated at locations exterior to a building.

BACKGROUND

Devices and systems are needed for providing access to the Internet at locations outside of building, for example, a home or other dwelling. As is well appreciated, a person will often move about their house and outside of their house while desiring to maintain access to a network, such as a Local Area Network (LAN) connected to the Internet or other wide area networks, by a user device. Non-limiting examples of user devices including smartphones, tablet computing devices, DISH™ entertainment platforms, smart health devices, streaming media players, smart home devices, or the like (herein, a "user device" (UD)). While the user moves about and within their home, connection by the UD to the LAN is often facilitated by a wireless connection to a router and/or one or more internal network extenders (INEs). Such connections typically occur using a wireless LAN (a WLAN) such as one formed using Wi-Fi™, Wi-Fi 5™, Wi-Fi 6E™, BLUETOOTH, narrowband IoT (Internet of Things), or other wireless communication technologies. While the user moves outside the home, the range and signal strength of the wireless signals provided by the router and/or extenders for the WLAN commonly decrease with distance and due to the presence of signal interfering obstacles, such as building walls, and the like, thereby creating Wi-Fi coverage holes (herein, "signal holes"), where WLAN and Internet connectivity is often not possible. In urban areas, such signal holes can often be overcome by connecting to a cellular provider, such as AT&T, VERIZON, T-MOBILE or the like (in the United States, with other providers existing in other territories).

For rural and/or mountainous areas, connections to cellular providers is often not possible. Accordingly, signal holes commonly exist for users of UDs outside of their home (or other buildings).

Also, while INEs are commonly used to extend a wireless signal range for a WLAN within a home, the use of INEs in an external environment is commonly not practical in view of environmental, power, and other concerns. Accordingly, needs exist for systems, devices and processes for addressing the above and other concerns.

SUMMARY

The various implementations of the present disclosure relate in general to devices, systems, and processes for facilitating a gateway outdoor unit access point (GOUAP).

In accordance with at least one implementation of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect of a system includes an integrator node. The integrator node may include a gateway, located within the building, coupled to the integrator node by a first link; and a gateway outdoor unit access point (GOUAP) coupled to the integrator node by a second link. The GOUAP may be coupled to a user device by a third link. The gateway may be coupled to a Cloud. The GOUAP provides access to the Cloud, by the user device, when the user device is located external to the building and within the environ. Other embodiments of this aspect include corresponding computer systems, apparatus, and computer programs recorded on one or more computer storage devices, each configured to perform the actions of the methods.

Implementations may include one or more of the following features. The system may include a first link that utilizes a multimedia over cable (MOCA) technology. The second link may utilize MOCA. The third link may utilize Wi-Fi™ technologies. The integrator node may facilitate use of a sixth link with the user device. The gateway may establish a fourth link with the user device. The user device may, when external to the building, utilize the third link, the second link, and the first link to communicatively couple with the gateway. The user device, when within the building, may selectively utilize one of the fourth link or the fifth link and the sixth link to communicatively couple with the gateway. The third link, the fourth link, the fifth link and the sixth link may utilize Wi-Fi technologies. The satellite node may communicate satellite signals with the satellite and communicate received satellite signals to the gateway via the first link.

The integrator node may include a signal combiner which combines satellite signals, received from the satellite node, with data signals, received from the GOUAP; resulting in a combined signal. The integrator node may transmit the combined signal over the first link to the gateway.

The integrator node may include a splitter which splits out second data signals received from the gateway. The integrator node may communicate the second data signals to the GOUAP. The GOUAP may communicate the second data signals to the user device when the user device is located externally of the building. The integrator node may be combined with the satellite node.

The antenna node may communicate cellular signals with a terrestrial node using a terrestrial link. The terrestrial node may communicate the cellular signals to the gateway using the terrestrial link, the eleventh link, and the first link.

The satellite node may communicate satellite signals with the satellite and communicate received satellite signals to the gateway via the first link.

The integrator node further may include a signal combiner which combines satellite signals, received from the satellite node, with data signals, received from the GOUAP, for transmission over the first link to the gateway.

The integrator node further may include a splitter which splits out second data signals received from the gateway. The integrator node may communicate the second data signals to the GOUAP. The GOUAP may communicate the second data signals to the user device when the user device is located externally of the building.

The integrator node may be combined with the satellite node and the antenna node. The antenna node may communicate broadcast signals received from a broadcast node using a second terrestrial link. The broadcast node may communicate the broadcast signals to the gateway using the second terrestrial link, the eleventh link, and the first link.

The terrestrial node may utilize at least one of a 3G/4G/5G technology. The broadcast node may utilize an ATSC 3.0 technology. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended FIGURES, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

FIG. 1 is an illustrative diagram of an implementation of a system for facilitating a GOUAP and in accordance with at least one implementation of the present disclosure.

DETAILED DESCRIPTION

The various implementations described herein are directed to devices, systems, and processes for facilitating outdoor use of WLANs by use of a GOUAP.

As used herein, an "environ" is a building, such as an office, or dwelling, such as a home, apartment, or the like. Herein, a home is used as a non-limiting example of an environ. For at least one implementation, an environ includes an area not exceeding the greater of one-half acre (½ acre) or two thousand, twenty-three square meters (2,023 m²). For other implementations, an environ may be defined to cover any distance within a 65% signal to noise ratio for one or more radio transceivers utilized in an GOUAP.

As shown in FIG. 1 and for least one implementation of the present disclosure, a system 100 for facilitating outdoor use of a WLAN within an environ 102 that includes a building 103 (such as a home). An integrator node 104 is attached to an exterior portion of the building 103, such as a roof or other structural member. The integrator node (IN) 104 is coupled to a gateway (GW) 112 by a first link 122. The first link 122 is also referred to herein as a Gateway-to-Integrator Node (GW2IN) link. For a given implementation, the first link 122 may include a combined power and data link and/or separate power and data links. For at least one implementation, a Multimedia over Cable (MOCA) implementation may be used, such as an implementation that is compatible with the MOCA 2.5 standard.

For an implementation, electrical power may be provided from the gateway 112 to the IN 104 via the first link 122. Non-limiting examples of technologies that may be used to provide power and data over a link (herein, "Combined Links") include Power-over-Ethernet (PoE) cables, High Definition Multimedia Interface (HDMI) cables, RG-59, RG-6 and other coaxial cables. It is to be appreciated that when combined links are used, voltages provided over the GW2IN link are commonly in the United States in one of the National Electrical Code's low distribution system voltage range of zero (0) to forty-nine (49) volts, the National Fire Protection Code protected extra-low voltage range as a nominal voltage of 30 Vrms or 60V dc for dry locations and 6 Vrms or 15V dc for other locations, or the like. When power is to be provided to the IN 104 at line voltages, such as 120V AC in the United States, such power may be provided using an electrical cable that is separate from a data cable and/or using a powerline with a powerline extender being integrated into the IN 104.

The integrator node (IN) 104 may be further communicatively coupled to a GOUAP 118 by a second link 124. The second link 124 is also referred to herein as an Integrator-to-GOUAP (IN2GOUAP) link. The second link 124 may use one or more of the technologies utilized for the first link 122.

The GOUAP 118 may be communicatively coupled to a user device (UD) 120 by a third link 126. The third link 126 is also referred to herein as the GOUAP-to-UD (GOUAP2UD) link. The third link 126 provides for a wireless coupling of the GOUAP 118 with the UD 120. For at least one implementation, the third link 126 utilizes Wi-Fi™ technologies. Other wireless communication technologies may be used for other implementations including, but not limited to, Near Field Communications (NFC), BLUETOOH™, cellular, near band Internet of Things (NB-IOT), or other limited distance wireless communications technologies.

As shown in FIG. 1 for purposes of illustration, the UD 120 is shown as being located at, any given time, at one of the locations "A", "B" and "C", with locations A and B being internal to the building 103 and location C being external to the building 103 (as represented by the respective designators, 120(A), 120(B), 120(c)). A given UD 120 may be located from time to time at one of such locations or elsewhere within or external to the building 103 and within the environ 102. When internal to the building 103, the system 100 may use radio frequency (RF) signals by and between the GW 112 itself and/or by and between an Internal Network Extender (INE) 113 and the UD 120 to communicatively couple the UD 120 with the GW 112. Any number of INEs 113, including none, may be used in a given implementation of the present disclosure.

A fourth link 134 may communicatively couple the GW 112 with the UD 120 when the UD 120 is at location "A" (120(A). The fourth link 134 is also referred to herein as the Gateway-to-UD (GW2UD) link. A fifth link 136 may communicatively couple the GW 112 with an INE 113. The fifth link 136 is also referred to herein as the Gateway-to-INE (GW2INE) link. A sixth link 144 may communicatively couple the INE 113 with the UD 120 when the UD 120 is, for example, at location B (120(B)). The sixth link 144 is also referred to herein as the INE-to-UD (INE2UD) link. For at least one implementation, one or more of the fourth link 134, the fifth link 136, and the sixth link 144 utilizes Wi-Fi™ technologies or other limited distance wireless communication technologies.

The GW 112 may be communicatively coupled to the "Cloud" (C) 114 (as further described below) by a seventh link 132. The seventh link 132 is also referred to herein as the Gateway-to-Cloud (GW2C) link. The Cloud 114 includes one or more servers (S) 116, the server 116 may take any form with non-limiting examples including web servers, application servers, database servers, streaming content servers, and others. Any known or later arising technologies may be used as a server 116. The Cloud 114 may be coupled to the server 116 by an eighth link 138. The eighth link 138 is also referred to herein as the Cloud-to- Server (C2S) link. The Cloud 114 may be communicatively coupled to one or more terrestrial nodes (TN) 110 by a ninth link 142. The ninth link 142 is also referred to herein as the Cloud-to-Terrestrial Node (C2TN) link.

The GW2C link, the C2S, and/or the C2N links may utilize any known or later arising communications technologies with non-limiting examples including Ethernet, Digital Subscriber Link (DSL), Fiber Gigabit services, cellular services, such as 3G/4G/5G, satellite internet services, Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

"Cloud" refers to cloud computing, cloud storage, cloud communications, and/or other technology resources which a given user does not actively manage or provide. A usage of a Cloud resource may be private (limited to certain users and/or uses), public (available for users and/or uses), hybrid, dedicated, non-dedicated, or otherwise. It is to be appreciated that implementations of the present disclosure may use Cloud resources to provide for processing, storage and other functions.

The integrator node (IN) 104 may be communicatively coupled to a satellite node (SN) 105. For an implementation, the IN 104 may be physically combined with the SN 105. For another implementation, the IN 104 may be provided separate from the SN 105. For implementations where provided separately, the IN 104 and the SN 105 are coupled by one or more combined links. The satellite node 105 may be coupled to a satellite 106 and receive broadcast satellite (DBS) signals, for example, from a DISH Network satellite, or other signals including satellite based Internet signals, such as those provided by the STARLINK, HUGHESNET, VIASAT and other services, using a tenth link 128. The tenth link 128 is also referred to herein as the Satellite link.

The integrator node (IN) 104 may be communicatively coupled to an antenna node 108 by an eleventh link 130. The eleventh link 130 is also referred to herein as the Integrator Node to Antenna Node (IN2AN) link. For at least one implementation, the integrator node 104 may be physically combined with the antenna node 108. For an implementation, the integrator node 104, antenna node 108 and satellite node 105 may be physically combined.

The antenna node 108 may be configured to receive wireless terrestrial (as opposed to satellite) based communications signals (herein, "cellular signals") over one or more twelfth links 140. The twelfth link 140 is also referred to herein as the Terrestrial link. The antenna node 108 may include one or more antennas, filters, signal processors, amplifiers or the like configured to communicate data wirelessly to/from and/or with one or more terrestrial nodes (TNs) 110 and/or broadcast nodes (BN) 111 (sending "broadcast signals") using the twelfth link 140. The twelfth link 140 may include one or more first terrestrial links for cellular signals and one or more second terrestrial links for broadcast signals. Non-limiting examples of BNs 111 include local television signal broadcast stations provided in the United States by ABC, CBS, NBC, FOX and other broadcasters; such broadcast stations broadcasting broadcast signals pursuant to the Advanced Television Systems Committee (ATSC) 3.0 standard. Non-limiting examples of TNs 110 include cellular service providers such as AT&T, VERIZON and T-MOBILE. In FIG. 1, the TN 110 and BN 111 are depicted by a tower symbol for purposes of simplification of the illustration. The TN 110 and BN 111 may be provided on separate towers, on the same tower, or otherwise.

Integrator Node (IN) 104

A non-limiting example of a IN 104 is signal combiner configured to communicate satellite signals via the SN 105, and/or terrestrial signals via the AN 108. For at least one implementation, the IN 104 may include a splitter, combiner and/or other signal processing components, such as filters, amplifiers, and the like configured to provide data received from the gateway 112 to the GOUAP 118. The IN 104 may be further configured to provide electrical power to one or more components of the SN 105, the AN 108, and/or the GOUAP 118.

For at least one implementation, the IN 104 may be configured for use with existing cabling coupling a GW 112 with one or more of the SN 105 and/or the AN 108. When existing cabling is utilized, concerns with electrical grounding, environmental protection (e.g., sealing protections for rain and snow melt), and the like may be already addressed by an existing installation. It is to be appreciated that at least one implementation of the present disclosure may be realized without having to provide new opening into the building 103, run new cabling, identify new cabling routes, or the like. The IN 104 coupled with the gateway 112 and the INE 113 provide a mesh network facilitating access to the Cloud by the user device 120 when the user device 120 is located within the building 103 and/or within the environ 102.

Using one or more of the above described links, the integrator node, the GOUAP, the gateway, and other system components (as appropriate), data and other signals may be communicated by and between the user device 120 and any other data source, such as the Cloud 114, server 116, terrestrial node 110, broadcast node 111, satellite 106, other user devices, and the like. The gateway 112 may function as an aggregator of data and a distributor of such data to a user device 120, depending on which of the existing links are best configured to communicate such data with the user device 120. It is to be appreciated that known data pathway selection technologies, including those used in conjunction with mesh networks, may be used by the gateway 112 to select one or more links to communicate data with a user device 120 at a then given location.

Although various implementations have been described with a certain degree of particularity, or with reference to one or more individual implementations, those skilled in the art could make alterations to the disclosed implementations without departing from the spirit or scope of the claims. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any combinations of elements and operations of an implementation of the present disclosure. Other implementations are therefore contemplated. It is intended that the matter contained in the above description and shown in the accompanying drawings shall be interpreted as illustrative implementations and not limiting. Changes in detail or structure may be made without departing from the basic elements recited in the following claims.

The invention claimed is:

1. A system comprising:
an integrator node, located externally of a building situated within an environ;
a gateway, located within the building, coupled to the integrator node by a first link; and
a gateway outdoor unit access point (GOUAP), not co-located with the integrator node, coupled to the integrator node by a second link;
wherein the GOUAP is coupled to a user device by a third link;
wherein the gateway is coupled to a Cloud; and
wherein the GOUAP provides access to the Cloud by the user device when the user device is located external to the building and within the environ.

2. The system of claim 1,
wherein the first link utilizes a multimedia over cable (MOCA) technology.

3. The system of claim 2,
wherein the first link utilizes MOCA 2.5 technologies.

4. The system of claim 3,
wherein the second link utilizes the MOCA 2.5 technology.

5. The system of claim 4,
wherein the third link utilizes Wi-Fi technologies.

6. The system of claim 1, further comprising:
a satellite node coupled by a satellite link to a satellite and further coupled to the integrator node;
wherein the satellite node communicates satellite signals with the satellite and communicates received satellite signals to the gateway via the first link.

7. The system of claim 6,
wherein the integrator node further comprises a signal combiner which combines satellite signals, received from the satellite node, with data signals, received from the GOUAP, resulting in a combined signal; and
wherein the integrator node transmits the combined signal over the first link to the gateway.

8. The system of claim 7,
wherein the integrator node further comprises a splitter which splits out second data signals received from the gateway;
wherein the integrator node communicates the second data signals to the GOUAP; and
wherein the GOUAP communicates the second data signals to the user device when the user device is located externally of the building.

9. The system of claim 8,
wherein the integrator node is combined with the satellite node.

10. The system of claim 1, further comprising:
an antenna node coupled to the integrator node by an eleventh link;
wherein the antenna node communicates cellular signals with a terrestrial node using a terrestrial link; and
wherein the terrestrial node communicates the cellular signals to the gateway using the terrestrial link, the eleventh link, and the first link.

11. The system of claim 10, further comprising
a satellite node coupled by a satellite link to a satellite and further coupled to the integrator node; and
wherein the satellite node communicates satellite signals with the satellite and communicates received satellite signals to the gateway via the first link.

12. The system of claim 11,
wherein the integrator node further comprises a signal combiner which combines satellite signals, received from the satellite node, with data signals, received from the GOUAP, for transmission over the first link to the gateway.

13. The system of claim 12,
wherein the integrator node further comprises a splitter which splits out second data signals received from the gateway;
wherein the integrator node communicates the second data signals to the GOUAP; and
wherein the GOUAP communicates the second data signals to the user device when the user device is located externally of the building.

14. The system of claim 13,
wherein the integrator node is combined with the satellite node and the antenna node.

15. The system of claim 14,
wherein the antenna node communicates broadcast signals received from a broadcast node using a second terrestrial link.

16. The system of claim 15,
wherein the broadcast node communicates the broadcast signals to the gateway using the second terrestrial link, the eleventh link, and the first link.

17. The system of claim 16,
wherein the terrestrial node utilizes at least one of a 3G/4G/5G technology.

18. The system of claim 17,
wherein the broadcast node utilizes an ATSC 3.0 technology.

19. A system comprising:
an integrator node, located externally of a building situated within an environ;
a gateway, located within the building, coupled to the integrator node by a first link; and
a gateway outdoor unit access point (GOUAP) coupled to the integrator node by a second link;
wherein the GOUAP is coupled to a user device by a third link;
wherein the gateway is coupled to a Cloud; and
wherein the GOUAP provides access to the Cloud by the user device when the user device is located external to the building and within the environ
an Internal Network Extender (INE), coupled to the gateway by a fifth link, located within the building;
wherein the INE facilitates use of a sixth link with the user device;
wherein the gateway establishes a fourth link with the user device;
wherein, while the user device is external to the building, the user device utilizes the third link, the second link, and the first link to communicatively couple with the gateway; and wherein, while the user device is within the building, the user device selectively utilizes one of the fourth link or the fifth link and the sixth link to communicatively couple with the gateway.

20. The system of claim 19, wherein the third link, the fourth link, the fifth link and the sixth link utilize Wi-Fi technologies.

\* \* \* \* \*